United States Patent Office 3,306,944
Patented Feb. 28, 1967

3,306,944
PROCESS FOR THE HYDRODEALKYLATION OF ALKYL AROMATIC HYDROCARBONS
Ernest L. Pollitzer, Hinsdale, Ill., assignor to Universal Oil Products Company, Des Plaines, Ill., a corporation of Delaware
No Drawing. Filed Dec. 27, 1965, Ser. No. 516,667
8 Claims. (Cl. 260—672)

This invention relates to a process for the hydrodealkylation of alkyl aromatic compounds. More specifically, the invention is concerned with a process for the demethylation of alkyl aromatic hydrocarbons utilizing a novel composition of matter as the catalyst therefor. In addition, the invention is also concerned with a process for obtaining oxidizable para-dialkyl-substituted aromatic hydrocarbons by partial dealkylation. The term "alkyl aromatic compound" as used in the present process and appended claims will refer to aromatic compounds containing at least one alkyl substitutent, examples of which include mono-alkyl aromatic compounds, dialkyl aromatic compounds, trialkyl aromatic compounds, etc. In addition, the term "aromatic" as used herein will refer to both mono- and polycyclic aromatic compounds.

Aromatic acids, and particularly dicarboxylic aromatic acids, are becoming increasingly valuable as intermediates in the preparation of many chemical compounds, for example, terephthalic acid which is para-benzenedicarboxylic acid, is useful as an intermediate in the preparation of synthetic fibers, a prime example being the preparation of so-called polyester fiber utilizing terephthalic acid as an intermediate therefor. In addition, other organic acids, both mono- and polycarboxylic acid in nature, will find other uses in the preparation of pharmaceuticals, resins and plastics. Many of these acids which comprise the preferred intermediates contain the carboxylic acid substituents in the para-position on the aromatic nucleus.

Therefore, it is necessary that the starting material from which the dicarboxylic acids are prepared contain alkyl substitutents in the para-position on the nucleus. When the materials comprise as alkyl aromatic compound such as toluene, ethylbenzene, cumene, methylnaphthalene, etc., it must be alkylated to form the desired dialkyl aromatic compound. However, alkylation of mono-alkyl aromatic compounds with an alkylating agent comprising ethylene and propylene derivatives such as ethylene, ethyl alcohol, ethyl halide, propyl alcohol, propylene, propyl halide, etc., invariably leads to the formation of varying amounts of ortho-dialkyl substituted aromatic compounds. These ortho-substituted derivatives are hard to separate from the para isomers and will of course, give ortho-dicarboxylic acids on oxidation thereof. However, in contradistinction to this, when the alkylating agent comprises a compound which contains an iso-configuration of four carbon atoms or more, such as isobutylene, isobutyl alcohol, isoamylene, isoamyl alcohol, etc., the resulting dialkyl-substituted aromatic product will contain the alkyl-substituents in the para- position due to the steric interaction between the alkyl group on the ring and the bulky entering group. However, one disadvantage of such compounds in which one alkyl substituent is a tertiary-alkyl radical is that the aforementioned tertiary-alkyl group cannot be oxidized per se to obtain the desired carboxylic acids.

It is therefore an object of this invention to provide a process for the hydrodealkylation of alkyl aromatic compounds whereby certain desired compounds are prepared, the latter being utilized for the preparation of the corresponding acids by an oxidation process.

A further object of this invention is to provide a process for the demethylation of alkyl side-chains which are attached to an aromatic nucleus.

In one aspect, an embodiment of this invention resides in a process for the dealkylation of an alkyl-substituted aromatic compound which comprises treating said compound with hydrogen in the presence of a dealkylation catalyst comprising a metal selected from the group consisting of rhodium, ruthenium, osmium and iridium composited on a promoted metal oxide support at dealkylation conditions, and recovering the resultant dealkylated compounds.

A specific embodiment of this invention is found in a process for the dealkylation of p-tert-butyltoluene, which comprises treating said p-tert-butyltoluene with hydrogen in the presence of a dealkylation catalyst comprising rhodium composited on a lithiated alumina support at a temperature in the range of from about 350° to about 500° C. and a pressure in the range of from about atmospheric to about 500 pounds per square inch, and recovering the resultant p-propyltoluene, p-ethyltoluene and p-xylene.

Other objects and embodiments will be found in the following further detailed description of this invention.

As hereinbefore set forth, the present invention is concerned with a process for the hydrodealkylation of an alkyl aromatic compound whereby said alkyl aromatic compound is treated with hydrogen in the presence of certain catalytic compositions of matter. Examples of alkyl aromatic compounds and particularly alkyl-substituted aromatic hydrocarbons which may be subjected to the hydrodealkylation process of the present invention include dialkyl-substituted aromatic hydrocarbons such as p-xylene, p-ethyltoluene, p-propyltoluene, p-t-butyltoluene, p-diethylbenzene, p-propylethylbenzene, p-di-isopropylbenzene, p-di-t-butylbenzene, 1,5-dimethylnaphthalene, 1-methyl-5-t-butylnaphthalene, p,p'-di-tert-butylbiphenyl, p,p'-dimethylbiphenyl, p,p'-diethylbiphenyl, etc. It is also contemplated within the scope of this invention that mono-alkyl aromatic hydrocarbons such as ethylbenzene, n-propylbenzene, isopropylbenzene (cumene), n-butylbenzene, t-butylbenzene, 1-methylnaphthalene, 1-ethylnaphthalene, 2-methylnaphthalene, 2-ethylnaphthalene, 1-methylanthracene, 1-ethylanthracene, t-butylanthracene, t-butylcrysene, etc. may also undergo dealkylation according to the process described herein. It is to be understood that the aforementioned compounds are only representative of the class of compounds which may be used and that the present invention is not necessarily limited thereto.

As hereinabove stated, when the desired product comprises a dicarboxylic aromatic acid in which the carboxylic substituents are in a para-position and the starting material is an alkyl-substituted aromatic hydrocarbon, the finished or desired product may be obtained by alkylating said mono-alkyl aromatic hydrocarbons such as toluene, ethylbenzene, cumene, etc., with an alkylating agent in which the active carbon atom is in such a configuration that the product of the alkylation will contain a tertiary alkyl substituent. For example, the mono-alkyl aromatic hydrocarbon may be alkylated with isobutylene, isoamylene, isobutyl alcohol, isobutyl chloride, isobutyl bromide, etc., in the presence of any alkylating agent known in the art and at alkylating conditions to form the desired product thereafter. This dialkyl-substituted aromatic hydrocarbon in which the alkyl substituents are in the para-position will then undergo hydrodealkylation in the presence of a catalyst hereinafter set forth in greater detail.

The aforementioned alkyl aromatic hydrocarbons are hydrodealkylated in the presence of a catalyst comprising a metal selected from the group consisting of rhodium, ruthenium, osmium and iridium composited on a promoted metal oxide support. The term "promoted" as used hereinbefore and hereinafter in the specification and also in the appended claims, will refer to a pretreatment of the metal oxide support with a salt or hydroxide of a metal selected from the group including alkali metals and alkaline earth metals such as lithium, sodium, potassium, rubidium, cesium, manganese, calcium, strontium and barium.

The preferred supports which are utilized in the process of the present invention are those which are relatively or substantially free from water. In most cases, this freedom from water of the support is achieved by a precalcination treatment of said support. This precalcination is carried out at a relatively high temperature in the range of from about 400° to about 700° C. and for a time sufficient to effect substantial removal of adsorbed or combined water from the support. The time required will vary depending upon the support, and in addition depending upon whether the water is in a combined or in merely a physically adsorbed form. In addition to the necessity for freedom from water, the support is characterized by the necessity for having a high surface area. By the term high surface is meant a surface area measured by surface adsorption techniques within the range of from about 25 to about 500 or more square meters per gram and preferably a support having a surface area of approximately 100 to 300 square meters per gram. For example, it has been found that certain low surface area supports such as alpha-alumina which is obviously free from combined water and which has been freed from adsorbed water is not a satisfactory support for the noble metals in the preparation of catalysts for use in the process of this invention. Alpha-alumina is usually characterized by a surface area ranging from about 10 to about 25 square meters per gram. In contrast, gamma-alumina which has a surface area ranging from about 100 to about 300 square meters per gram, and which has been freed from adsorbed water and which contains little combined water, is a satisfactory support. Celite, a naturally occurring mineral after precalcination, is not a satisfactory support. Celite has a surface area of from about 2 to about 10 square meters per gram. In addition, aluminas which contain combined water but which have relatively high surface areas are also not satisfactory supports. Such aluminas include dried alumina monohydrates which have not been sufficiently calcined to remove combined water and to form gamma-alumina. These alumina hydrates may have surface areas ranging from 50 to about 200 square meters per gram but because they contain combined water are not satisfactory supports. Particularly preferred supports for the preparation of catalysts for use in the process of this invention include high surface area crystalline alumina modifications such as gamma-, eta- and theta-alumina, although these are not necessarily of equivalent suitability. However, as is obvious from the above discussion the limitation on the use of any particular support is one of freedom from combined or adsorbed water in combination with the surface area of the support selected. In addition to the aforementioned types of support another type is that which is prepared from an alkali aluminate such as sodium aluminate, potassium aluminate, etc., from which a substantial majority of the alkali metal has been removed leaving only the alumina with a relatively minor amount of the alkali metal present.

The desired support, preferably, although not necessarily gamma-, eta- or theta-alumina is pretreated with a promoter in any manner. One method of impregnating the solid support is to treat said support with an alkali metal hydroxide or nitrate such as lithium nitrate, lithium hydroxide, potassium hydroxide, potassium nitrate, sodium hydroxide, sodium nitrate, etc., and thereafter calcined at a temperature usually in the range of from about 500° to about 700° C. whereby said salt or hydroxide is thoroughly decomposed.

Following this treatment, the desired catalytic composition of matter is then obtained by treating the promoted metal oxide support with a salt of the desired metal such as rhodium chloride, rhodium nitrate, ruthenium chloride, ruthenium nitrate, osmium chloride, iridium chloride, etc., in an amount sufficient to that the finished catalyst will contain from about 0.5 to about 5% by weight of the desired metal based on the finished catalyst.

The process in which the alkyl aromatic hydrocarbon is subjected to hydrodealkylation and preferably hydrodemethylation in the presence of a catalytic composition of matter of the type hereinbefore set forth in greater detail may be effected in either a batch or continuous type operation. For example, when a batch type operation is used, a quantity of the alkyl aromatic hydrocarbon to be hydrodealkylated is placed in an appropriate apparatus which may, if so desired, comprise a rotating autoclave. The desired catalytic composition of matter is also charged thereto and the apparatus is sealed. Following this, hydrogen is pressed in until the desired pressure which may be in the range of from about 1 to about 500 pounds per square inch is reached, the hydrogen to hydrocarbon ratio being in a range of from about 2:1 to about 25:1 moles of hydrogen per mole of hydrocarbon. Thereafter the apparatus is heated to the desired operating temperature which may be in a range of from about 350° to about 500° C. Upon completion of the desired residence time, the apparatus and contents thereof are allowed to cool to room temperature, the excess pressure is vented and the reaction product is recovered. After recovery of the reaction product, the desired hydrodealkylated product is separated by conventional means such as fractional distillation under reduced pressure and recovered.

It is also contemplated within the scope of this invention that the process described herein may be effected in a continuous manner of operation. When such a type of operation is used, the alkyl aromatic hydrocarbon is continuously charged to a reaction zone which contains a catalytic composition of matter of the type hereinbefore set forth, said zone being maintained at the proper operating conditions of temperature and pressure. Liquid hourly space velocities ranging from about 0.5 to about 20 and preferably from about 5 to about 10 will be used. In addition, hydrogen is charged to the reaction zone at such a rate so as to maintain the hydrogen to hydrocarbon ratio within the limits hereinbefore set forth in greater detail. After passage through the reaction zone, the reactor effluent is continuously withdrawn, the reaction mixture being separated from unreacted starting materials, the latter being recycled to form a portion of the feed stock while the former is subjected to fractional distillation under reduced pressure to recover the desired products.

The following examples are given to illustrate the process of the present invention which, however, are not intended to limit the generally broad scope of the present invention in strict acordance therewith.

*Example I*

A catalytic composition of matter was prepared by impregnating a calcined alumina base with lithium nitrate so that the lithium content was 0.5% by weight based on the combined catalyst. Thereafter, the promoted base was calcined at a temperature of 1000° F. for a period of 2 hours. The calcined base was then impregnated with rhodium chloride in a hydrochloric acid solution in an amount so as to give a catalyst composition which contained 0.75% by weight of rhodium based on the support. The catalyst composition was dried, thereafter calcined in an atmosphere of air containing 25% steam for a period of 5 hours at 950° F. and thereafter ground to 20–40 mesh.

The catalyst prepared according to the above paragraph was placed in a reactor comprising a reaction tube inserted in an aluminum bronze block furnace. The charge stock comprising cumene was dried over high surface sodium and thereafter charged to the reactor. The reactor was maintained at a temperature of from 350° to 450° C. while the hydrogen to cumene ratio was maintained at 8:1. The pressure of the reactor was maintained at approximately 10 pounds per square inch while the cumene was added at a liquid hourly space velocity of 5.0. The liquid product which was recovered from the plant was collected and subjected to a gas-liquid chromatographic analysis. This analysis disclosed a 95% selectivity of the conversion of cumene to toluene and ethylbenzene, said ethylbenzene being present in the product in an amount approximately three times the amount of toluene.

*Example II*

The catalyst used in the present example was prepared in a manner similar to that set forth in Example I above. The reactor used was also similar to that while the charged stock comprised p-tert-butyltoluene. The reactor was maintained at a temperature of about 400° C. and a pressure of about 100 pounds per square inch. The hydrogen to hydrocarbon ratio was about 26:1 while the p-tert-butyltoluene was charged to the reactor at a liquid hourly space velocity of about 6.3. The liquid product was analyzed under a gas-liquid chromatograph and was found to contain p-propyltoluene, p-ethyltoluene and xylene, the first named compound being present in a major proportion. In addition, the selectivity amounted to 83.2%.

*Example III*

A catalyst comprising approximately 0.75% rhodium by weight based on a support of lithiated alumina is prepared in a manner similar to that hereinbefore set forth. A reactor also similar to that hereinbefore described containing the aforesaid catalyst is heated to a temperature of about 400° C. A feed stock comprising p-propyltoluene is charged to the reactor at a liquid hourly space velocity of about 7 while hydrogen is charged thereto so that the hydrogen/hydrocarbon ratio is about 10:1. In addition, the pressure of the reactor is maintained at about 100 pounds per square inch. The liquid product obtained from the reactor is subjected to a gas-liquid chromatographic analysis and will disclose the presence of p-ethyltoluene and p-xylene.

*Example IV*

In this example, a catalyst similar to that hereinbefore set forth is charged to a reactor which is maintained at a temperature of about 400° C. A feed stock comprising p,p'-di-t-butylbiphenyl is charged thereto at a rate so that the hydrogen/hydrocarbon ratio is approximately 20:1. The pressure of the reactor is maintained at about 100 pounds per square inch during the reaction time. The liquid product resulting from the once-through operation is recovered and subjected to a gas-liquid chromatographic analysis which will disclose the presence of p,p'-dipropylbiphenyl and p,p'-diethylbiphenyl.

*Example V*

A catalyst comprising approximately 0.75% by weight of rhodium based on a support of lithiated alumina containing about 0.5% lithium was prepared in a manner similar to that set forth in Example I above. The catalyst was then placed in a reactor also similar to that hereinbefore described which was heated to a temperature of about 450° C. A feed stock comprising toluene was charged to the reactor along with hydrogen in such quantities so that the hydrogen to toluene ratio was about 8:1, the pressure of the reactor being maintained at about 100 pounds per square inch. The liquid hourly space velocity was maintained at 0.5. The liquid product was recovered and subjected to a gas-liquid chromatographic analysis. This analysis disclosed a 49.2% conversion of toluene to benzene with an accompanying selectivity of 94.3%.

I claim as my invention:

1. A process for the demethylation of an alkyl-substituted aromatic compound having an alkyl side-chain of at least 2 carbon atoms which comprises treating said compound with hydrogen in the presence of rhodium composited on an alkali metal promoted metal oxide support at dealkylation conditions effective for the demethylation of said alkyl side-chain, and recovering the resultant dealkylated compounds including an alkyl aromatic having a smaller alkyl group than said side-chain.

2. The process as set forth in claim 1, further characterized in that said dealkylation conditions include a temperature in the range of from about 350° to about 500° C. and a pressure in the range of from about atmospheric to about 500 pounds per square inch.

3. The process as set forth in claim 1, further characterized in that said metal oxide support comprises alumina.

4. The process as set forth in claim 1, further characterized in that said support comprises lithiated alumina.

5. The process as set forth in claim 4, further characterized in that said alkyl-substituted aromatic compound is p-tert-butyltoluene and said dealkylated compounds comprise p-propyltoluene, p-ethyltoluene and p-xylene.

6. The process as set forth in claim 4, further characterized in that said alkyl-substituted aromatic compound is p-propyltoluene and said dealkylated compounds comprise p-ethyltoluene and p-xylene.

7. The process as set forth in claim 4, further characterized in that said alkyl-substituted aromatic compound is p,p'-di-t-butylbiphenyl and said dealkylated compounds comprise p,p'-dipropylbiphenyl, p,p'-diethylbiphenyl and p,p'-dimethylbiphenyl.

8. The process as set forth in claim 4, further characterized in that said alkyl-substituted aromatic compound is cumene and said dealkylated compounds comprise ethylbenzene and toluene.

References Cited by the Examiner

UNITED STATES PATENTS 3,204,006    8/1965    Broughton _____ 260—672

DELBERT E. GANTZ, *Primary Examiner.*

G. E. SCHMITKONS, *Assistant Examiner.*